US010259441B2

(12) United States Patent
Korotin

(10) Patent No.: US 10,259,441 B2
(45) Date of Patent: Apr. 16, 2019

(54) AMPHIBIOUS TRANSFORMER VEHICLE

(71) Applicant: Roman Korotin, Thornhill (CA)

(72) Inventor: Roman Korotin, Thornhill (CA)

( * ) Notice: Subject to any disclaimer, the term of this patent is extended or adjusted under 35 U.S.C. 154(b) by 320 days.

(21) Appl. No.: 15/170,156

(22) Filed: Jun. 1, 2016

(65) Prior Publication Data
US 2017/0349156 A1    Dec. 7, 2017

(51) Int. Cl.
| B60V 1/16 | (2006.01) |
| B60V 1/18 | (2006.01) |
| B62D 27/06 | (2006.01) |
| B60V 3/06 | (2006.01) |
| B60K 5/12 | (2006.01) |
| B60K 11/04 | (2006.01) |

(52) U.S. Cl.
CPC .............. B60V 3/065 (2013.01); B60K 5/12 (2013.01); B60K 11/04 (2013.01); B60V 1/16 (2013.01); B60V 1/18 (2013.01); B60Y 2200/42 (2013.01)

(58) Field of Classification Search
CPC .. B60V 3/00; B60V 3/06; B60V 3/065; B60V 1/04; B60V 1/02; B60V 1/043; B60V 1/16; B60V 1/18; B62D 33/044; B62D 27/065; B62D 27/06
USPC ....... 180/116, 117, 120, 121, 122, 125, 127, 180/129; 114/283
See application file for complete search history.

(56) References Cited

U.S. PATENT DOCUMENTS

| 3,476,069 A | * | 11/1969 | Hall ..................... | B60V 1/046 114/67 R |
| 3,662,854 A | * | 5/1972 | Bertin ................... | B60V 1/046 180/116 |
| 3,685,607 A | * | 8/1972 | Eglen .................... | B60V 1/043 180/116 |
| 4,175,636 A | * | 11/1979 | Broughton ............. | B60V 1/043 180/119 |
| 4,658,926 A | * | 4/1987 | Paradis, IV ........... | B60V 1/16 114/67 A |
| 5,738,302 A | * | 4/1998 | Freeland ................ | B60V 1/15 180/116 |
| 6,016,762 A | * | 1/2000 | Price ..................... | B63B 1/18 114/274 |

(Continued)

FOREIGN PATENT DOCUMENTS

CA      2164010    *   5/1997        B60V 3/06

*Primary Examiner* — Anne Marie M Boehler
(74) *Attorney, Agent, or Firm* — Nadya Reingand; Yan Hankin

(57) ABSTRACT

The invention concerns an amphibious transformer vehicle (ATV) having flexible pontoon-skegs and a flexible frame allowing the ATV which carries passenger or cargo to smoothly transition between varying types of terrain and handle waves and uneven terrain. This vehicle is designed to move over water, snow, ice, ground, sand and other loose surfaces, as well as paved and other hard services as well as grass and light vegetation. It can make transitions between all the surfaces without need to stop or perform any modifications to the vehicle to transition between surfaces. This vehicle has advantages over other hovercraft and airboats that are designed with rigid frames and hulls. Based on a design using a flexible frame and structures that lean on flexible pontoon-skegs it can handle waves and obstacles without being damaged and it is not upset by a wide range of variations in terrain.

20 Claims, 15 Drawing Sheets

(56) References Cited

U.S. PATENT DOCUMENTS

| 2009/0101426 A1* | 4/2009 | Vonli | B60V 1/043 |
| | | | 180/116 |
| 2010/0000817 A1* | 1/2010 | Clapp | B60V 1/18 |
| | | | 180/117 |
| 2012/0171910 A1* | 7/2012 | Schramer | B60V 1/043 |
| | | | 440/12.51 |

* cited by examiner

AMPHIBIOUS TRANSFORMER VEHICLE

BACKGROUND OF THE INVENTION

Field of the Invention

The invention is in the field of amphibious vehicles.

Background Art

U.S. Pat. No. 4,231,131 by Young discloses an inflatable boat where the floor of the boat is above the water line of the boat. The boat has a motor that is below the water line of the boat as the sole means of propulsion. This inflatable craft in incapable of travel across land or ice and does not have skirts such that it can ride on an air cushion of its own production.

U.S. Pat. No. 5,727,494 by Caserta et al. discloses an amphibious vehicle with wheels that may be retractable as well as pontoons or multiple hulls that may be retractable. The vehicle uses one engine for both land propulsion through its wheels and water propulsion using a propeller in the water. There is no mention of flexibility. A rigid vehicle will have disadvantages when going over waves as it will not absorb any of the wave's force but rather will be buffeted by the wave. Furthermore the vehicle must pause after entering water and before leaving water in order to retract or deploy the wheels. This has a disadvantage in not allowing for quick and smooth transitions between land and water.

U.S. Pat. No. 6,595,812 by Haney discloses a snow mobile with a floating hull so that it can float on water. The snow mobile has an endless belt with a plurality of longitudinally spaced apart integral lugs as its means of propulsion on snow, ice, and water. Such a belt suffers significant wear to its lugs when driven on dry land or paved surfaces as compared to a vehicle riding on a cushion of air. Furthermore while the skis for the snow mobile have suspension components to deal with rough terrain the entire vehicle is not constructed to flex and absorb contours in terrain or lessen the impact of waves while on the water.

SUMMARY OF THE INVENTION

An amphibious transformer vehicle (ATV) having front left and right skirts, rear left and right loop bags, and inflatable side and middle pontoon-skegs along a longitude of the vehicle. This vehicle is designed to move over water, snow, ice, ground, sand and other loose surfaces, as well as paved and other hard surfaces as well as grass and light vegetation. It can make transitions between all the surfaces without need to stop or perform any modifications to the vehicle to transition between surfaces. This vehicle has advantages over other hovercraft and airboats that are designed with rigid frames and hulls. Based on a design using a flexible frame and structures that lean on flexible pontoon-skegs it can handle waves and obstacles without being damaged and it is not upset by a wide range of variations in terrain.

Like in a sidewall type hovercraft, flexible pontoon-skegs are working as side walls keeping the air volume and pressure underneath that is controlled by lifting fans.

Middle pontoon-skeg divides air chamber into two parts—left and right subchambers.

This efficiently replaces side hovercraft skirts, providing unprecedented stability at all modes of operating as well as steady air discharge that is working like grease between skegs, front skirts, rear loop bags and the surface. Air discharge lifts the vehicle from the surface to a height of 1-2 inches, and makes it fly above the surface like a hovercraft. A combination of flexible inflatable pontoons-skegs, a flexible front skirts and rear loop bags, a flexible tubing lower frame, flexible powertrain, and cabin independent modules acting as the vehicles suspension when traveling over the previously listed surfaces and to provide for a smooth ride. Depending on vehicle payload and operational conditions pressure inside pontoon-skegs is increased or decreased by automatic inflation system controlled by pilot from dashboard. Over flat terrain for higher speeds and better fuel economy pressure in the pontoon-skegs must be set at a high pressure between 1.5 and 3.0 pounds per square inch gauge (psig). Over high waves and rough terrain for reducing air leakage from underneath chambers and improving flexibility that helps to pass obstacles, the pressure in the pontoon-skegs must be decreased down to between 0.5 and 1.5 psig. From wear and tear inflatable pontoon-skegs are protected by easily replaceable polyethylene shells, that are attached to the inflatable pontoon-skegs by lacing.

Amphibious transformer vehicle consists of three major independent modules—lower flexible tubing frame, flexible powertrain, and flexible cabin. Each of the modules could be customized for certain needs without any modifications required to be done to other modules.

A lower frame designed as a construction scaffold or tubing cross mesh The frame is built primarily of longitudinal stringers and cross stringers. The stringers are joined. The stringers can be joined by welding, clamping, fastening or other joining means.

In a preferred embodiment the stringers are joined by special crimp clamps machined from solid aluminum bars. A powertrain module and a cabin module are attached to the lower frame by crimp clamps as well. The lower frame clamps have openings for the longitudinal stringers and cross stringers at tow end of the clamp. The openings can be pass through openings such that the stringers pass through the clamps. In a preferred embodiment the openings are positioned such that the clamped stringers would be held in right angles (90 degrees) to each other. The outside edge of the frame clamps have a small gap and a perpendicular bolt hole. When a bolt is placed in the bolt hole and tightened it closed the small gap and acts to increase frictional forcers between the lower frame clamps and the lower frame stringers The clamps have a single pass through opening to allow it to fit on a lower frame stringers with a small gap in the opening and a perpendicular bolt hole. The powertrain and cabin clamps uses predrilled bolt holes so that a powertrain and cabin may be attached to the lower frame, exactly at the certain points.

In this preferred embodiment by clamping rather than screwing into the lower frame stringers this avoids placing additional point stresses on the lower frame stringers which may lead to cracks and lose resistance to the loads in the lower frame stringers.

The brackets have openings for the longitudinal members and cross members at two ends of the bracket.

In an alternative embodiment the brackets have a fixing means such as a screw or bolt to further secure the brackets to the frame members.

At least three inflatable pontoons are underneath the frame and are all parallel to one another. At least two longitudinal members are connected to each of the pontoons. In a preferred embodiment the longitudinal members pass through loops along the length of the pontoon. The loops have gaps such that a frame bracket connects to the longitudinal frame members and are attachable to the cross frame members.

The frame is constructed so that it is flexible and has the ability to conform and absorb changes in the surface on which the craft is on. This allows the craft to crest waves, ride on uneven ice and other uneven surfaces, and to transition between surfaces such as land and water, ice and water, dry land and snow, water and snow covered land, etc. smoothly.

In a preferred embodiment the frame members are tubular. In a further embodiment the tubular frame members are made of an aluminum alloy chosen for its flexibility and lightness while still providing strong though flexible frame. A further advantage of aluminum is it maintains flexibility and suffers little or no mechanical deformation in many conditions and in many different operating temperatures.

Between each pair of adjacent inflatable pontoons there is an inflatable skirt. In a craft with three inflatable pontoons there will be two inflatable skirts, for each additional inflatable pontoon there would be an additional inflatable skirt. The inflatable pontoons are sealed so that they are air tight. The inflatable pontoons have valves for inflation and deflation. These valves are either manually or automatically controlled. The inflatable skirts are not air tight. The inflatable skirts are designed such that air escapes only from the bottom of the skirt so that the craft rides on a cushion of air like a hovercraft. The combination of inflatable pontoons and inflatable skirts work such that the craft is supported on land and floats on water whether or not the inflatable skirts are inflated.

The inflatable pontoons and inflatable skirts are preferably made out a polyurethane coated fabric.

The inflatable nature of the pontoons and skirts means the frame and inflatable sections are easier to store or ship.

A section of the frame toward rear of the craft has an additional support frame. The support frame bears the additional load of at least one engine or motor, at least one fuel cell, at least two skirt inflating fans, and at least one main propulsion fan with rudders. The engine or motor may be electric or internal combustion.

The support frame and components mounted to it are detachable for easier and greater shipping and storage density.

In a preferred embodiment the craft has an internal combustion engine.

In a preferred embodiment the engine is connected at both ends of its drive shaft. To the front facing end there is a mechanical linkage connecting the engine to the at least two skirt inflating fans. The skirt inflating fans are variable in speed so that the amount of air cushion beneath the craft is controllable. To the rear facing end there is another mechanical linkage connecting the drive shaft of the motor to the main propulsion fan.

The mechanical linkage is preferably a belt or chain driven linkage with gears or pulleys connecting the driveshaft of the engine to the main propulsion fan. In another embodiment there is a driveshaft extension linkage from the engine to the drive main propulsion fan. In a different embodiment the engine is connected to a transmission and the transmission is then mechanically linked to the main propulsion fan.

In another embodiment the at least two skirt inflating fans and at least one main propulsion fan are driven by electric motors and the fuel cell is a hydrogen fuel cell, battery, or some other means to store electrical energy. In this embodiment there may or may not be an additional engine acting as generator to recharge the batter or other electrical storage means.

In any embodiment the one of or all of the engine or motor, fuel cell, and supporting parts such as control units, fluid tanks, radiators, and so on are individually or together covered by hoods for additional protection.

Each of the skirt inflating fans and the at least one main propulsion fan have an intake side and an exhaust side. The intake side of each fan has a protective mesh to catch objects and prevent them from passing through the fans in order to protect the fan blades from harm.

Towards the front end of the craft there is a control console. The console controls the speed of the skirt inflating fans and the at least one main propulsion fan. The console also controls the rudders on the at least one main propulsion fan thereby controlling the direction of the craft. The console is linked to control mechanisms for the skirt inflating fans, main propulsion, engine or motor, and rudders by mechanical, electrical, or hydraulic means.

Also the front of the craft can be configured in multiple configurations. In one embodiment the from of the craft has a platform with seats for passengers. In another embodiment the front of the platform is configured to haul cargo. In either embodiment the front of the craft may have additional framework to support a shelter for the passenger or cargo area. With or without a shelter the craft may be equipped with a windshield. The windshield may additionally have a windshield wiper.

In a preferred embodiment the craft is equipped with headlights.

In another embodiment the ATV has at least two inflatable pontoon-skegs being parallel and adjacent with a space between the at least two inflatable pontoon-skegs running a longitude of the ATV. Two of the at least two inflatable pontoon-skegs that are parallel and adjacent with the space between forms a pontoon-skeg pair. Each inflatable pontoon-skeg is only a component in up to two pontoon-skeg pairs. The ATV has at least one pontoon-skeg pair. In the space between the at least two inflatable pontoon-skegs in the at least one pontoon-skeg pair there is a front skirt and a rear loop bag. An air chamber cell is formed by the pontoon-skegs of a pontoon-skeg pair as a pair of sidewalls the front skirt and the rear loop bag. The air chamber cell maintains an air pressure and volume controlled by a lifting fan. Connected to and on top of the at least one pontoon-skeg pair there is a flexible frame. Connected to the flexible frame there are modules including a powertrain module, a pilot dashboard, and a cargo module or cabin module. The modules are connected to the flexible frame by a plurality of module clamps. The lifting fan is part of the powertrain module. The ATV being capable of traveling over varied terrain including water, snow, ice, ground, sand and other loose surfaces, paved and other hard services, grass, and light vegetation.

The specific embodiments described herein are intended to further explain the best mode known for practicing the disclosure and to enable others skilled in the art to utilize the disclosure in such, or other, embodiments and with various modifications required by the particular applications or uses of the present disclosure. The specific techniques, conditions, materials, and proportions set forth to illustrate the principles and practice of the invention are exemplary only and should not be taken as limiting the scope of the invention. It is intended that the appended claims be construed to include alternative embodiments to the extent permitted by the prior art.

BRIEF DESCRIPTION OF THE DRAWINGS

The present invention will now be discussed in further detail below with reference to the accompanying figures in which.

DETAILED DESCRIPTION OF THE PREFERRED EMBODIMENTS

Figure 1:
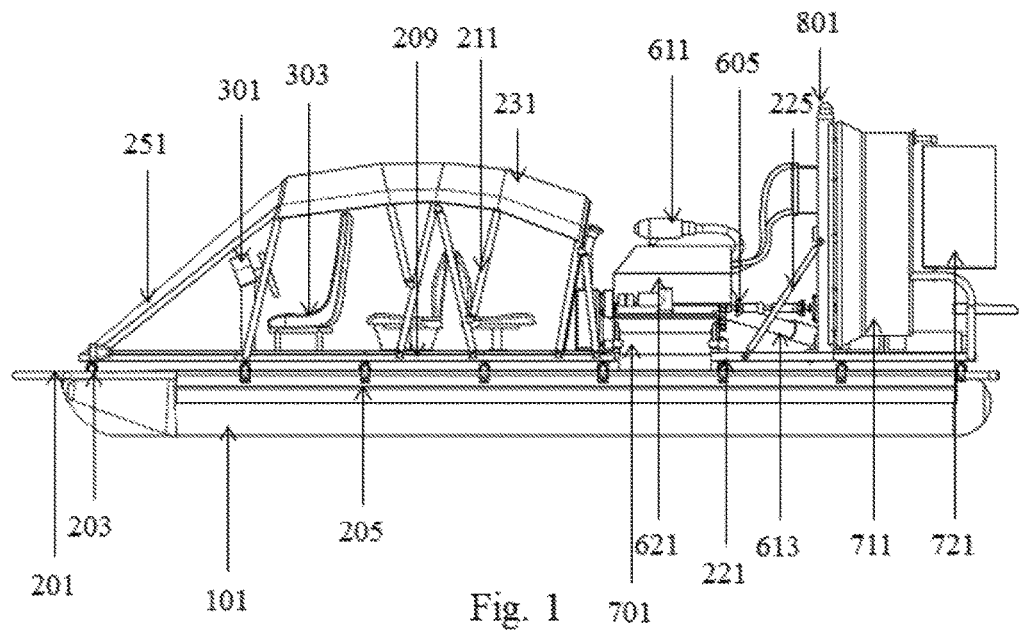
FIG. 1 shows the amphibious transformer vehicle (ATV) from a side view.
Figure 2:
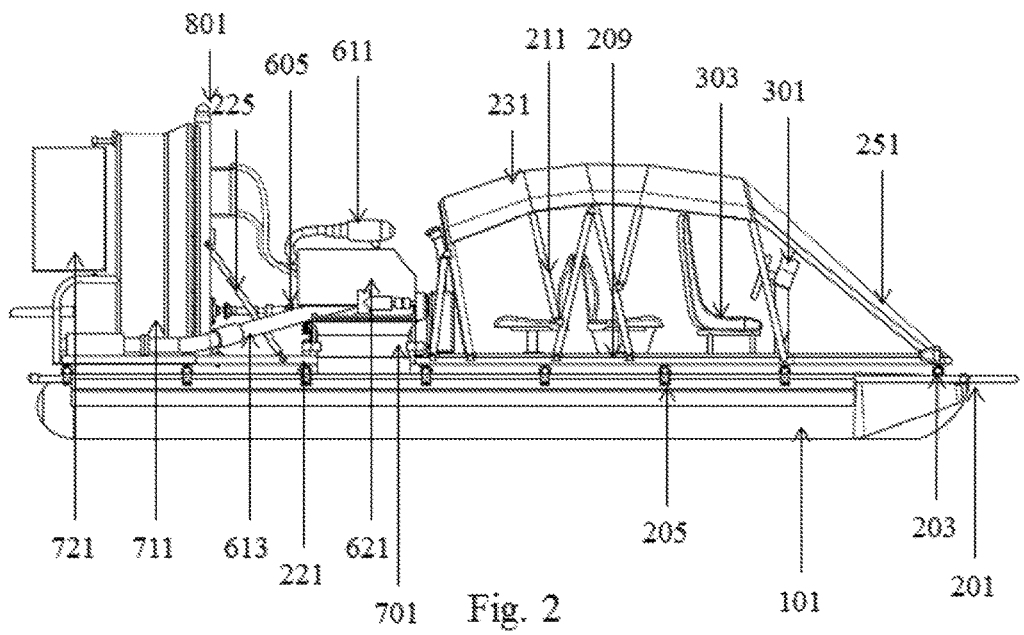
FIG. 2 shows the ATV from a side view.
Figure 3:
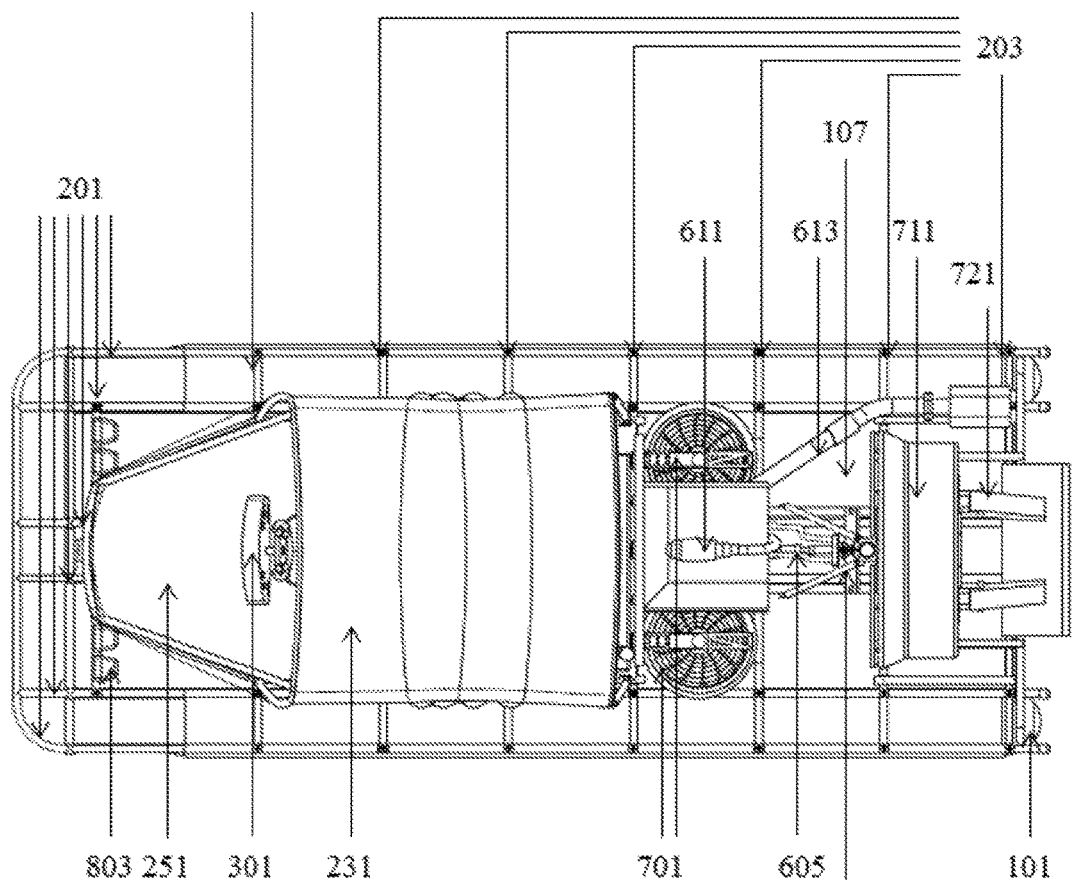
FIG. 3 shows the ATV from a top view.
Figure 4:
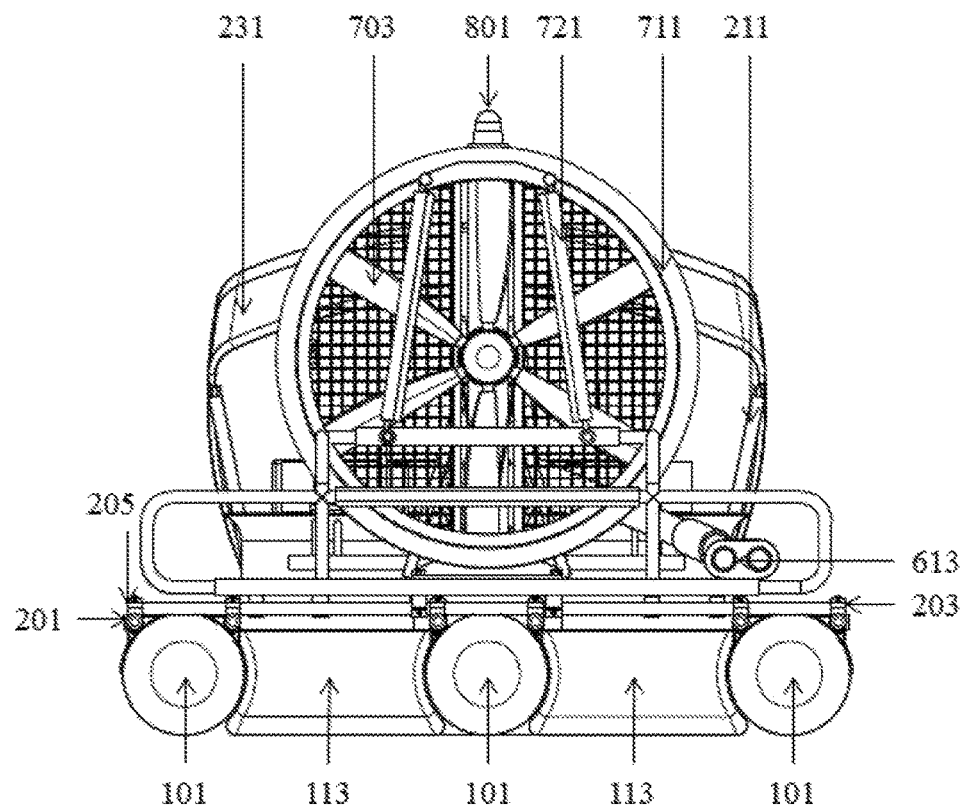
FIG. 4 shows the ATV from a rear view.
Figure 5:
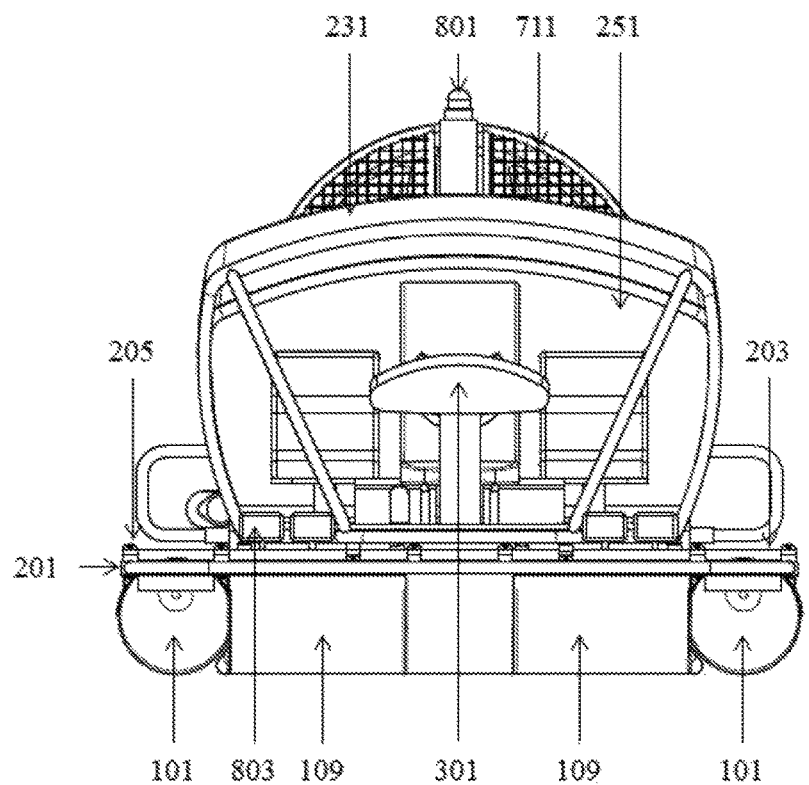
FIG. 5 shows the ATV from a front view.
Figure 6:
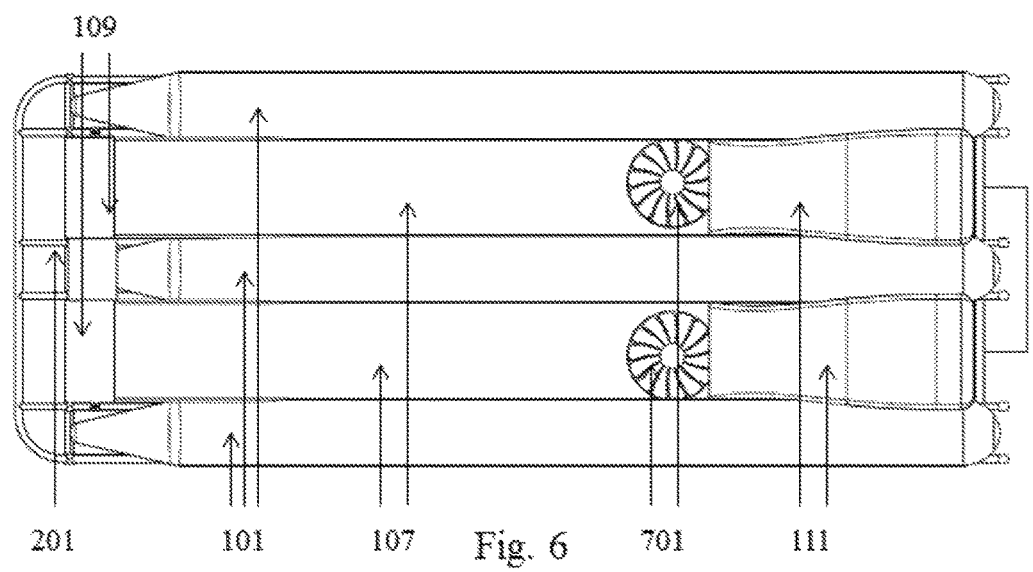
FIG. 6 shows the ATV from a bottom view.
Figure 7:
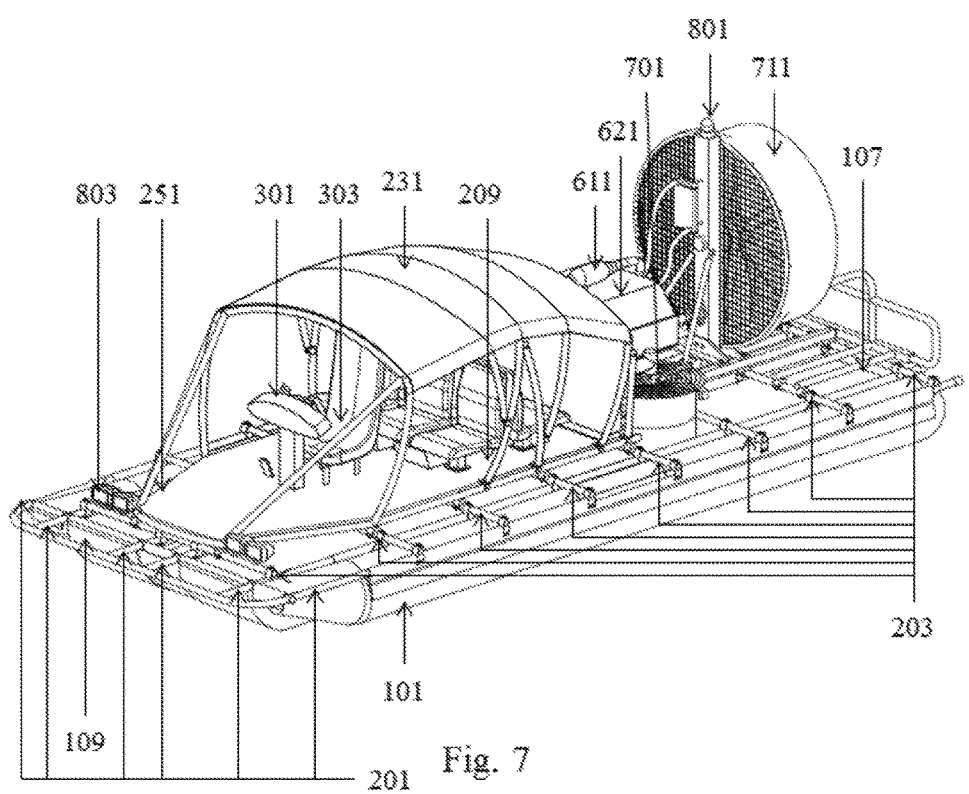
FIG. 7 shows the ATV from a front top perspective view.
Figure 8:
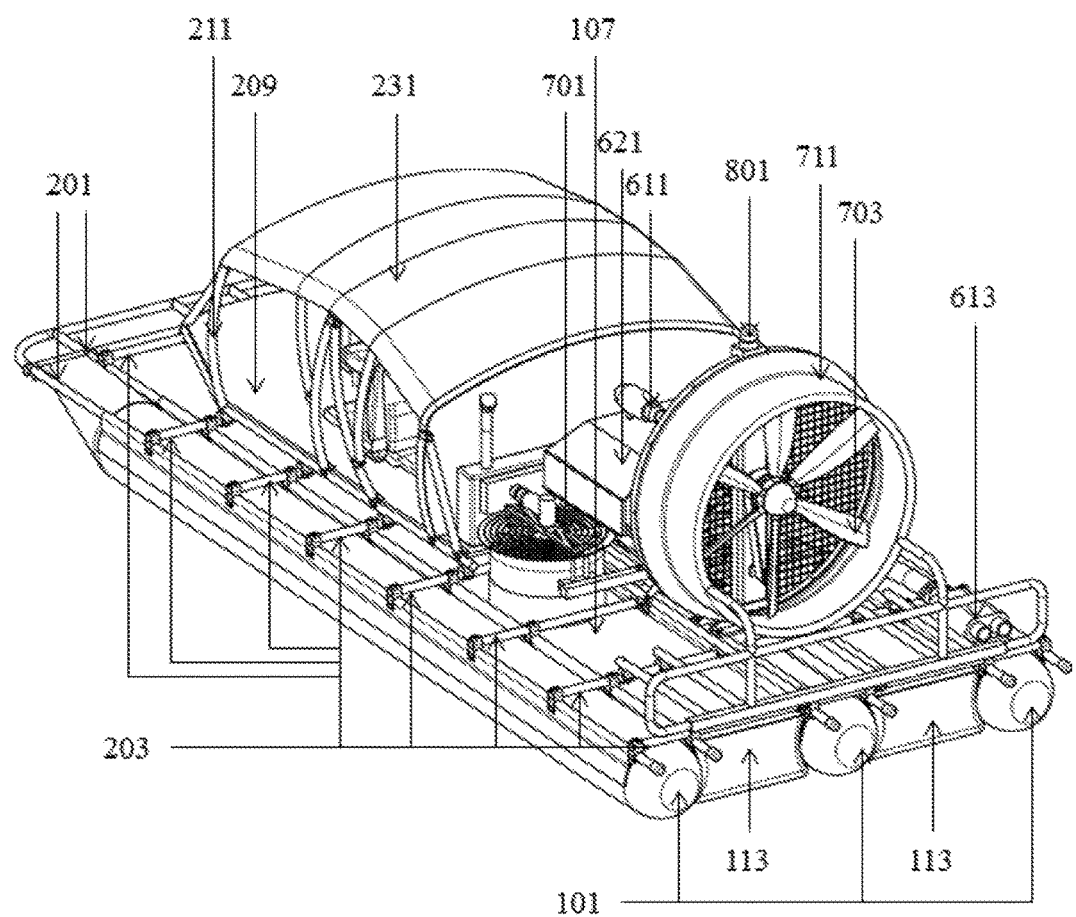
FIG. 8 shows the ATV from a rear top perspective view.
Figure 9:
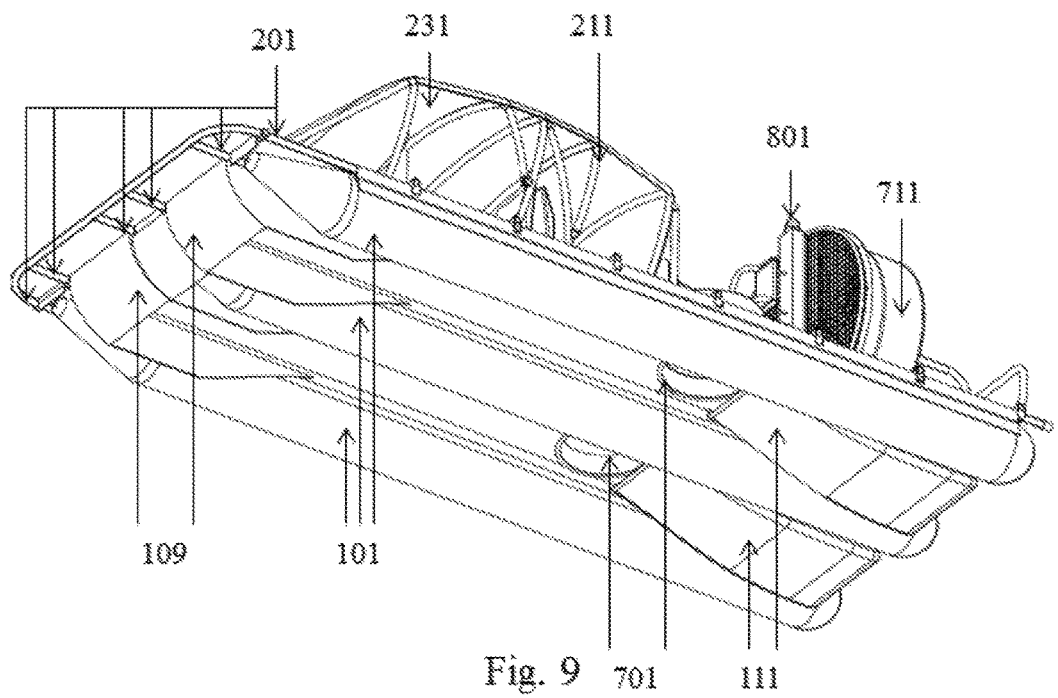
FIG. 9 shows the ATV from a front bottom perspective view.
Figure 10:
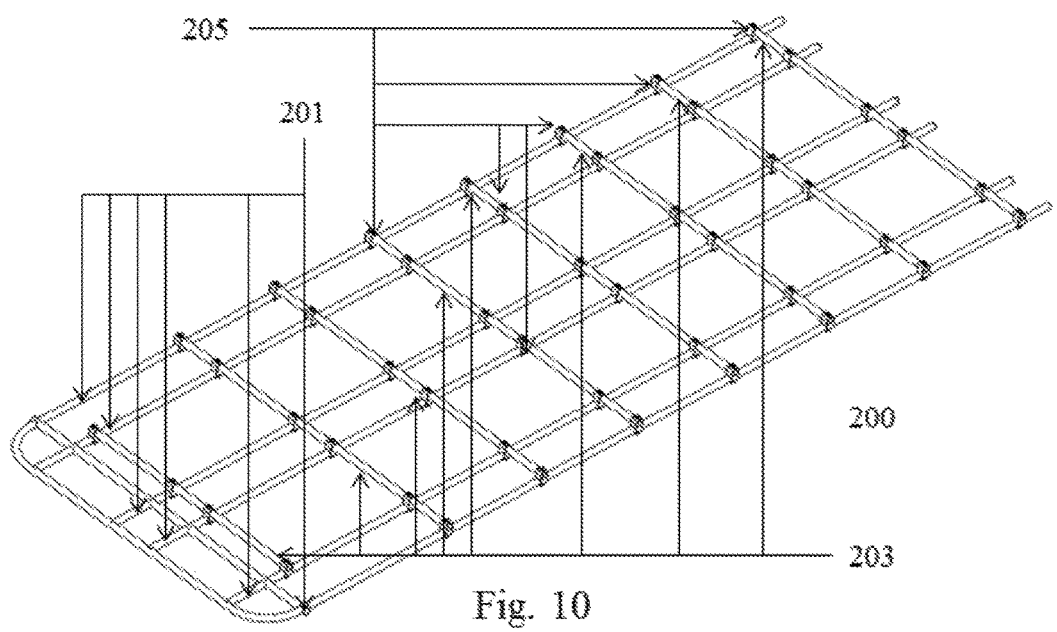
FIG. 10 shows the ATV's flexible frame from a front top perspective view.
Figure 11:
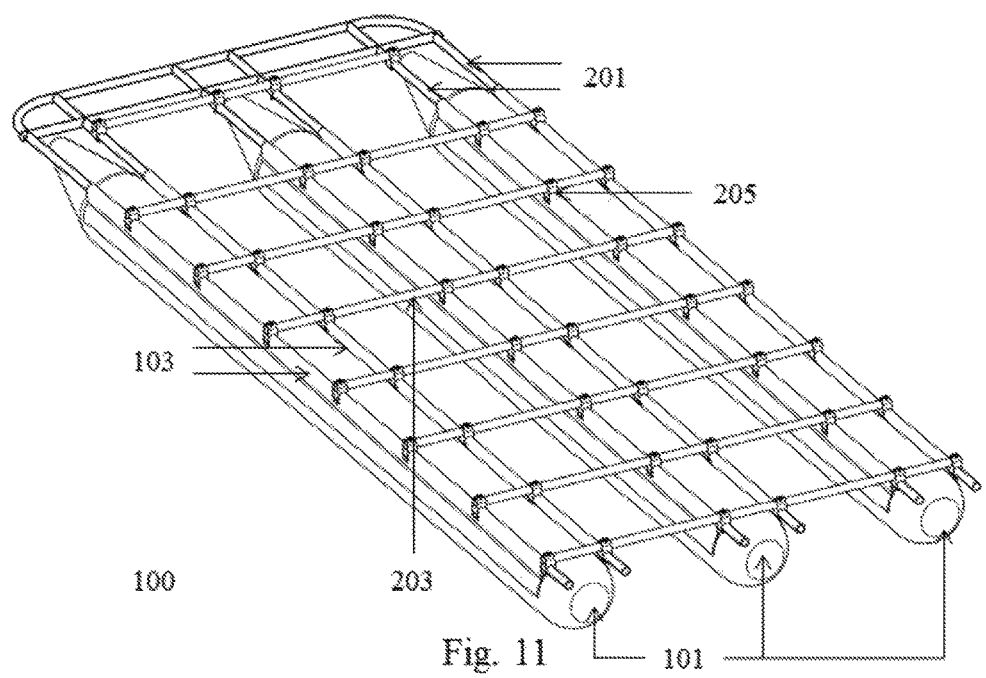
FIG. 11 shows the ATV's flexible frame and pontoon-skegs from a rear top perspective view.
Figure 12:
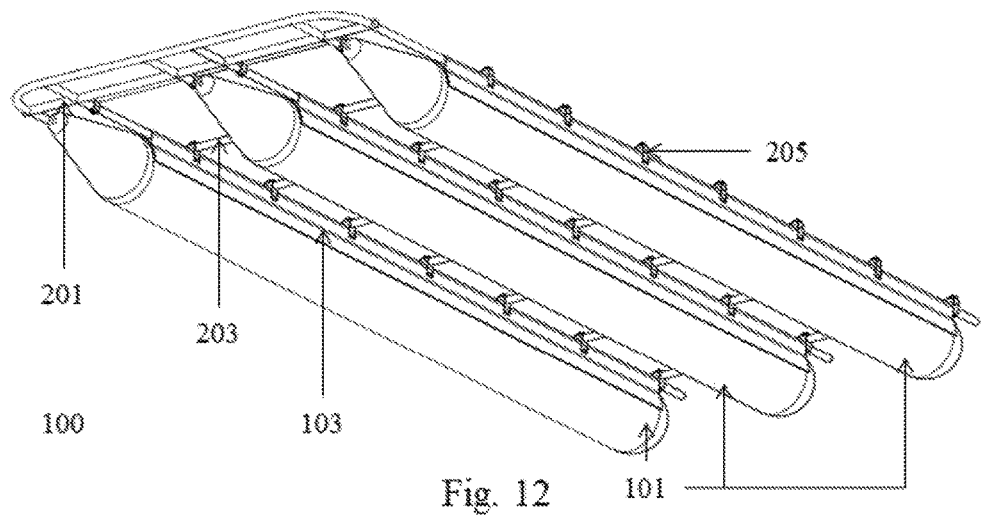
FIG. 12 shows the ATV's flexible frame and pontoon-skegs from a front bottom perspective view.
Figure 13:
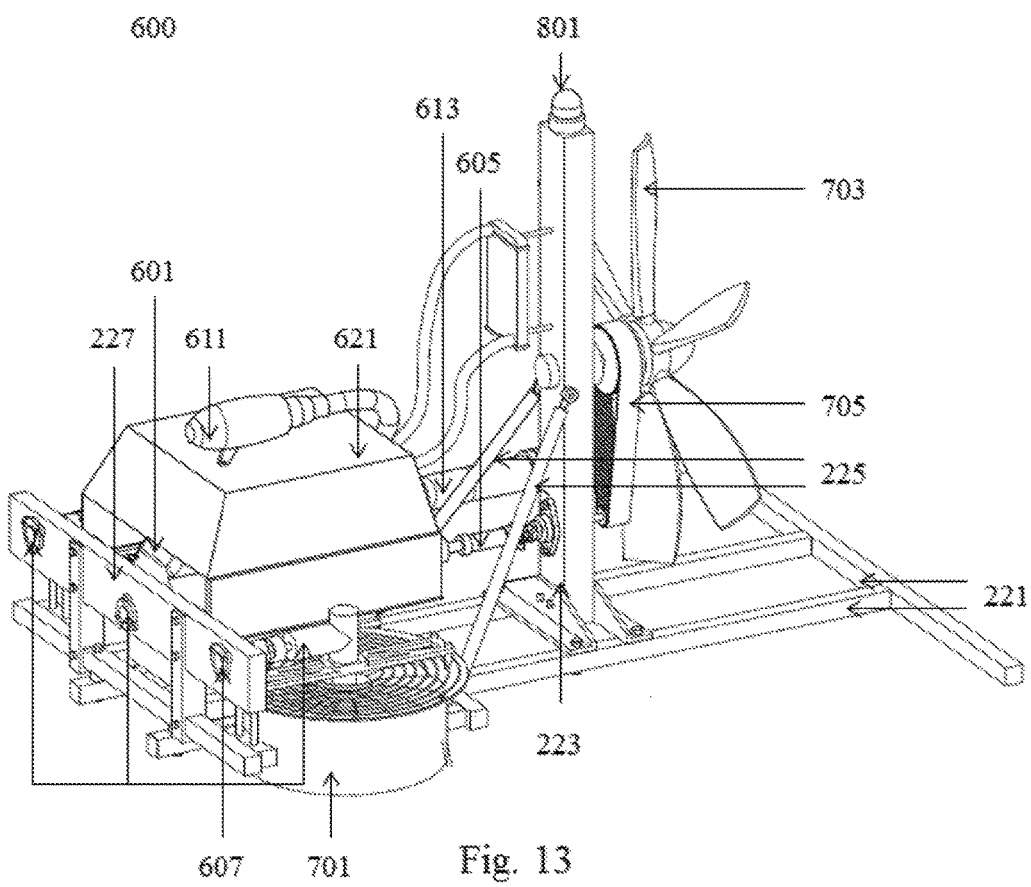
FIG. 13 shows the ATV's powertrain module from a front top perspective view.
Figure 14:
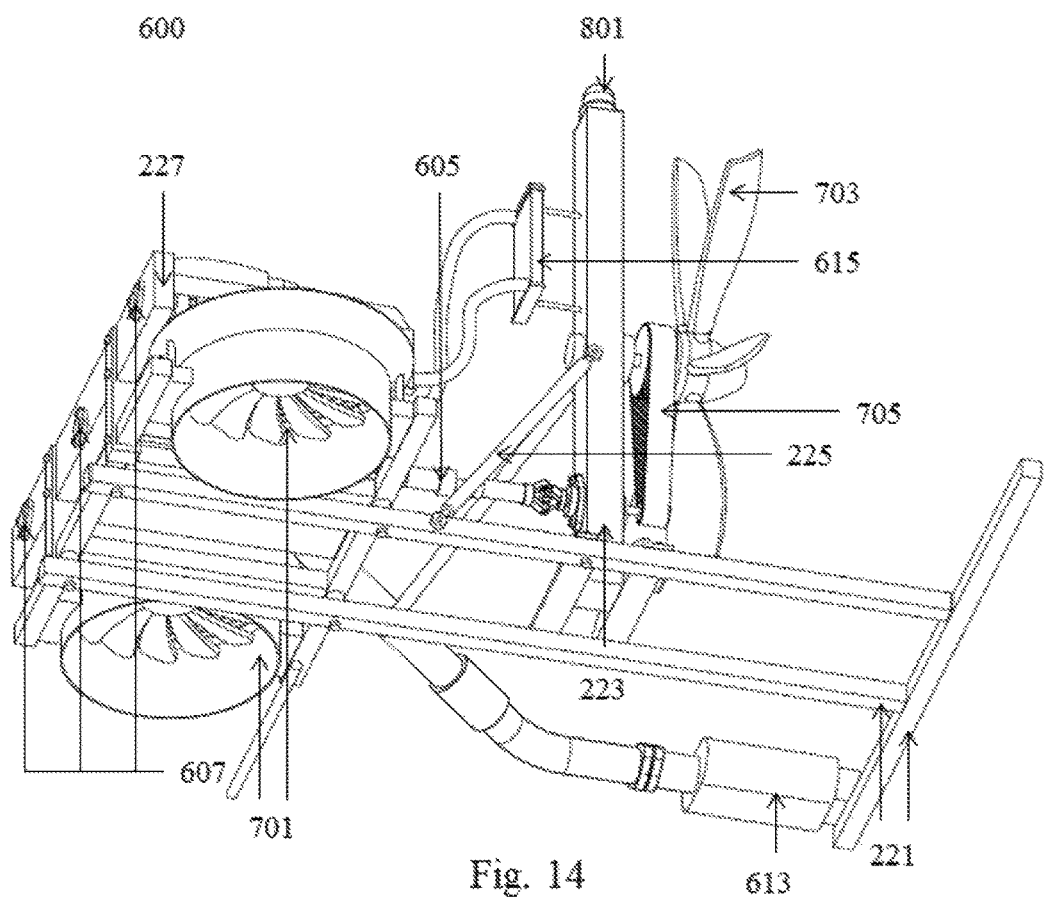
FIG. 14 shows the ATV's powertrain module from a front bottom perspective view.
Figure 15:
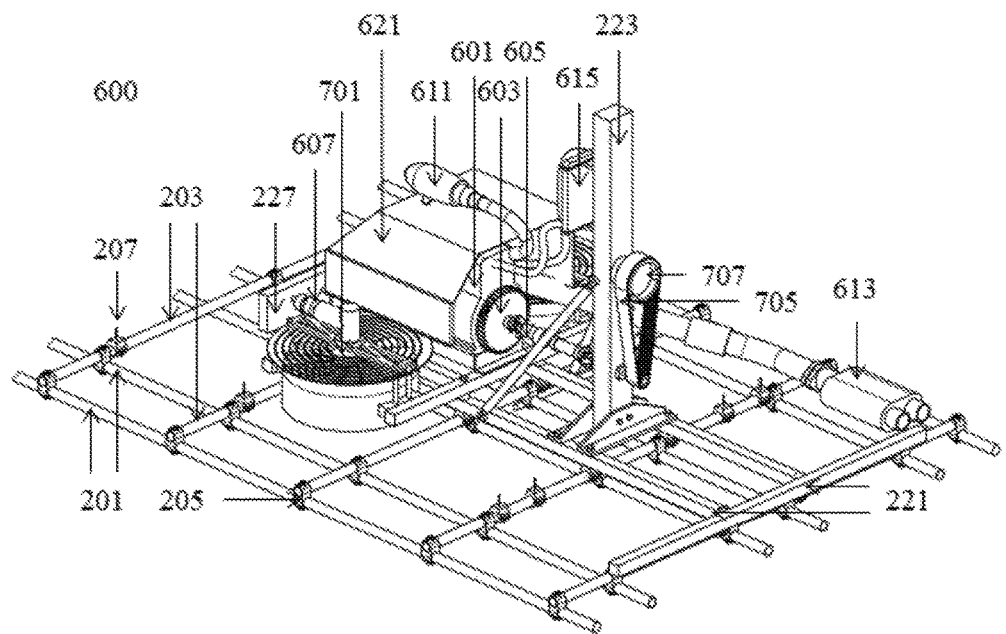
FIG. 15 shows the ATV's powertrain module mounted to the flexible frame from a rear top perspective view.
Figure 16:
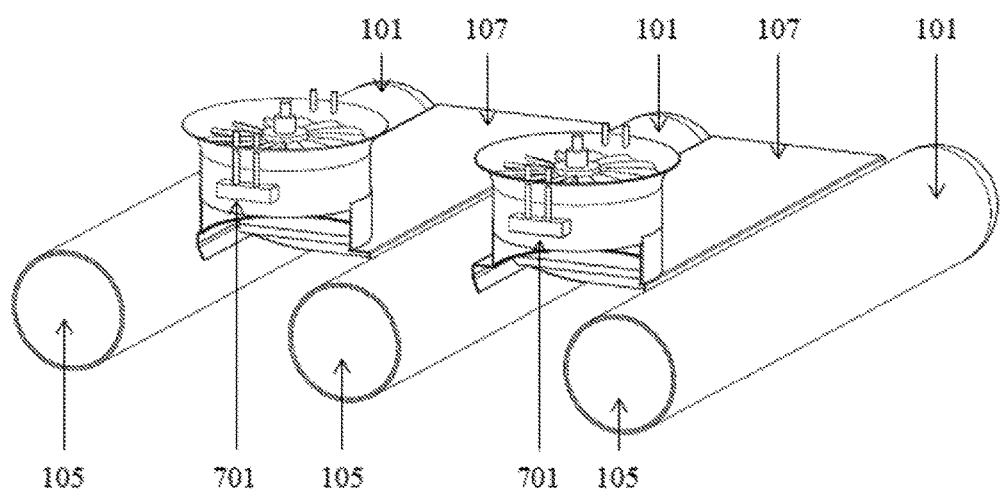
FIG. 16 shows the ATV's pontoon-skegs, air chamber cell, and lifting fans in a cross sectional front top perspective view.
Figure 17:
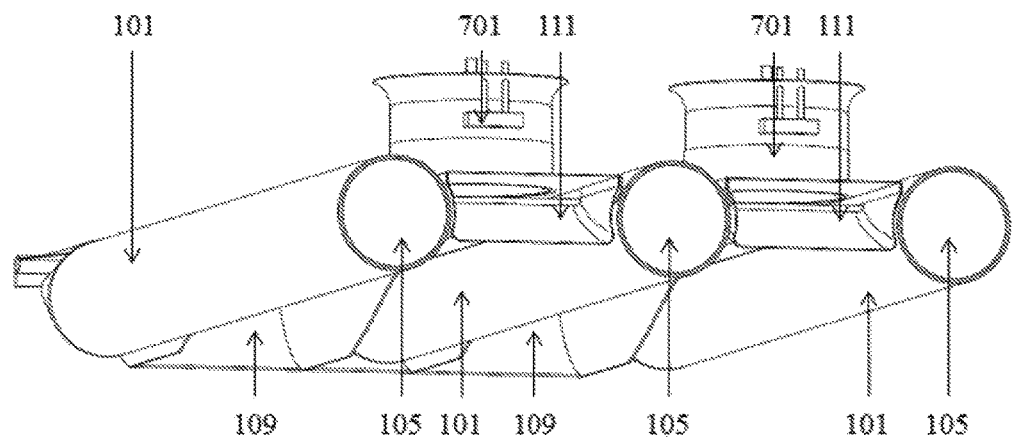
FIG. 17 shows the ATV's pontoon-skegs, air chamber cell, and lifting fans in a cross sectional rear bottom perspective view.
Figure 18:
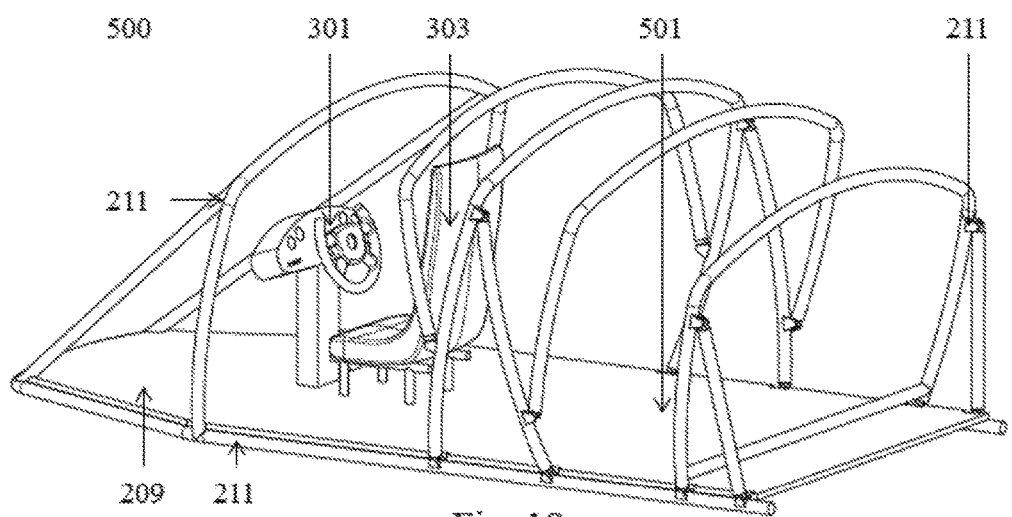
FIG. 18 shows the ATV's pilot dashboard and chair on a cargo module with a canopy frame in a rear top perspective view.
Figure 19:
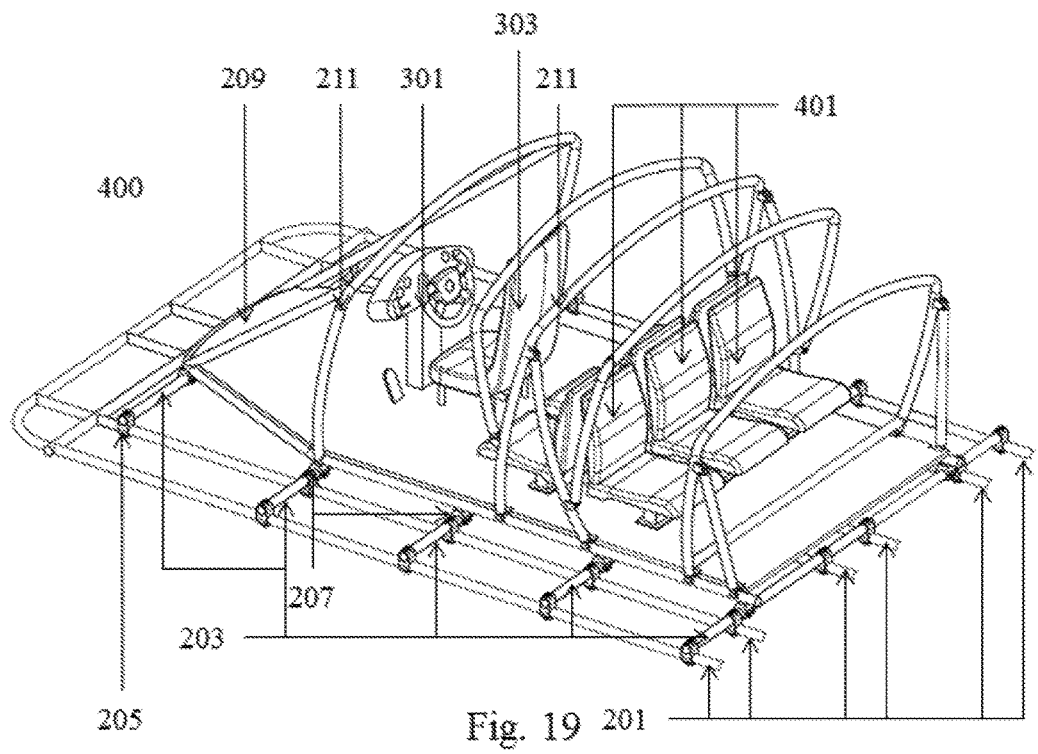
FIG. 19 shows the ATV's pilot dashboard and chair on a passenger module with a canopy frame in a rear top perspective view.

Reference is being made to FIGS. 1-22. An amphibious transformer vehicle (ATV) 000 with pontoon-skegs 101 on the bottom. Mounted on top of the pontoon-skegs 101 are longitudinal stringers 201 and connected to those are cross stringers 203. In a preferred embodiment the longitudinal stringers 201 and cross stringers 203 are connected by frame crimp clamps 205.

The longitudinal stringers 201 and cross stringers 203 together form a flexible frame 200 on which are connected to all other modules by module crimp clamps 207.

The longitudinal stringers 201 are connected to the pontoon-skegs 101 by passing through pontoon-skeg loops 103. Between each pair of pontoon-skegs 101 there is an air chamber formed by the pair of pontoon-skegs 101 the front skirt 109, a rear skirt 113 and a rear loop bag 111. The top of the air chamber is defined by air chamber top 107. The amount of air pressure in the air chamber is managed by adjusting a lifting fan 701 which pass through air chamber top 107. Each pair of pontoon-skegs 101 with air chamber has one lift fan 701. In a three pontoon-skeg 101 embodiment as shown there are two parallel air chambers. The pontoon-skegs 101 are also inflatable with pontoon-skeg air chamber 105 as a hollow space for air. The pontoon-skegs 101 are air tight, though in alternative embodiments they may have their internal pressure adjusted by a pontoon-skeg valve and pontoon-skeg compressor (not shown).

The pontoon-skegs 101, front skirt 109, rear skirt 113, air chamber top 107, and rear loop bag 111 are all flexible. The pontoon-skegs 101, front skirt 109, rear skirt 113, air chamber top 107, and rear loop bag 111I along with the lift fans 701 act to keep an air volume and pressure underneath the ATV 000 like a hovercraft. The pontoon-skegs 101, front skirt 109, rear skirt 113, air chamber top 107, rear loop bag 11 land the flexible frame 200 allow the ATV 000 to transition smoothly between many different types of terrain including land and water, ice and water, dry land and snow, water and snow covered land, etc. smoothly.

The inflatable skirts defined by pontoon-skegs 101, front skirt 109, rear skirt 113, air chamber top 107, and rear loop bag 111 are not air tight. The inflatable skirts are designed such that air escapes only from the bottom of the skirt so that the ATV 000 rides on a cushion of air like a hovercraft. The combination of inflatable pontoon-skegs 101 and inflatable skirts work such that the ATV 000 is supported on land and floats on water whether or not the inflatable skirts are inflated.

The inflatable pontoon-skegs 101 and inflatable skirts are preferably made out a polyurethane coated fabric. The inflatable nature of the pontoon-skegs 101 and skirts means the frame and inflatable sections are easier to store or ship.

Depending on vehicle payload and operational conditions, pressure inside the pontoon-skegs 101 is increased or decreased by automatic inflation system controlled by pilot from pilot dashboard 301. Over flat terrain for higher speeds and better fuel economy, pressure in the pontoon-skegs 101 must be set at a high pressure between 2.5 and 3.0 pounds per square inch gauge (psig). Over high waves and rough terrain for reducing air leakage from underneath chambers and improving flexibility that helps to pass obstacles, the pressure in the pontoon-skegs must be decreased down to between 0.1 and 0.15 psig. From wear and tear, the inflatable pontoon-skegs are protected by easily replaceable polyethylene shells (outer surface of pontoon-skegs 101 as shown), which are attached to the inflatable pontoon-skegs by lacing (not shown).

Amphibious transformer vehicle consists of three major independent modules—flexible frame 200, flexible powertrain 600, and either flexible passenger cabin 400 or flexible cargo platform 500. Each of the modules could be customized for certain needs without any modifications required to be done to other modules.

A lower frame designed as a construction scaffold or tubing cross mesh The frame is built primarily of longitudinal stringers 201 and cross stringers 203. The stringers are joined. The stringers can be joined by welding, clamping, fastening or other joining means. The flexible frame and design of the ATV allow for the ATV to traverse at least three foot drops when traveling in a forward direction. In a preferred embodiment the ATV 000 and flexible frame 200 are built to function for at least 10,000 duty hours without structural failure.

In a preferred embodiment the stringers are joined by special frame crimp clamps 205. The frame crimp clamps 205 are preferably machined from solid aluminum blocks. The flexible powertrain module 600 and flexible passenger cabin module 400 or flexible cargo platform 500 are attached to the flexible frame 200 by module crimp clamps 207.

The frame crimp clamps 205 have openings 205B for the longitudinal stringers 201 and cross stringers 203 at the end of the frame crimp clamp body 205A. The openings 205B can be pass through openings such that the stringers pass through the clamps. In a preferred embodiment the frame crimp clamps 205 and the module crimp clamps 207 are machined from solid aluminum bars for increased structural rigidity and to decrease the likelihood of structurally compromising defects.

Figure 20:
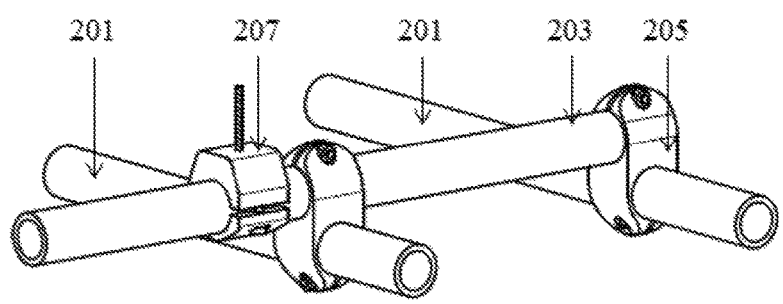
FIG. 20 shows the ATV's frame members and crimp clamps.
Figure 21:
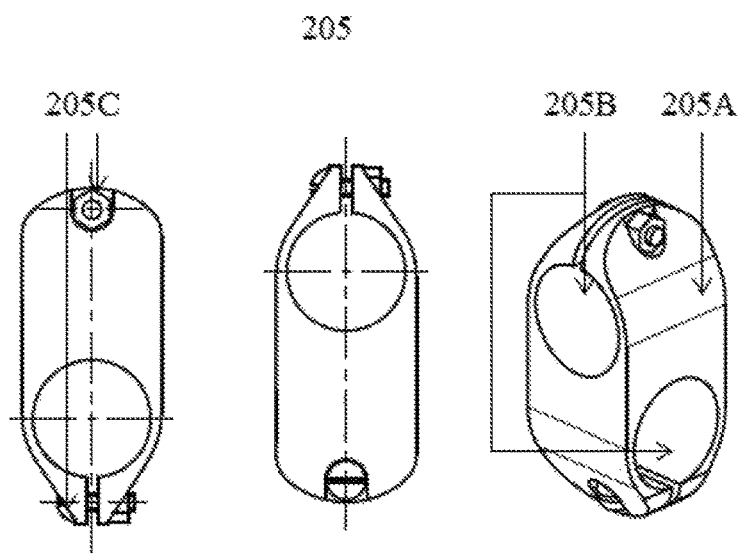
FIG. 21 shows the ATV's crimp clamps.
Figure 22:
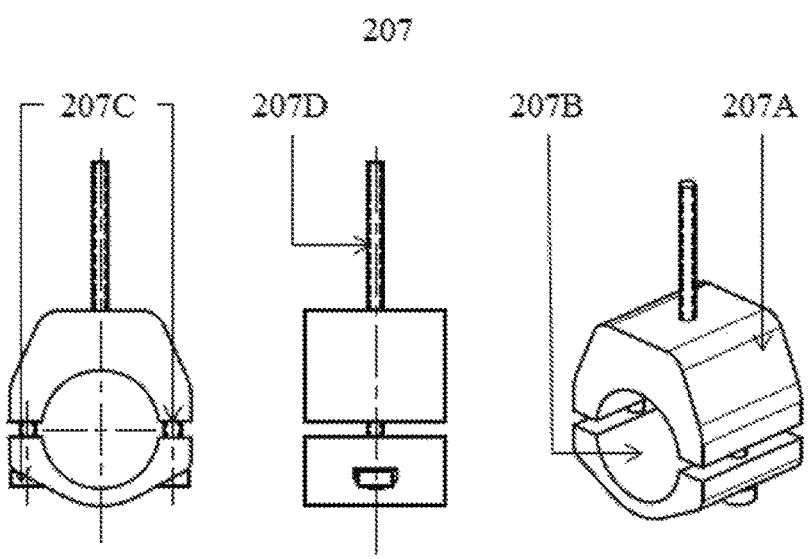
FIG. 22 shows the ATV's module clamps.

In a preferred embodiment the openings are positioned such that the clamped stringers would be held in right angles (90 degrees) to each other 205 as shown in FIGS. 20 and 21. The outside edge of the frame crimp clamp body 205A has a small gap and a perpendicular bolt hole with frame crimp clamp nut and bolt 205C passing through. When the frame crimp clamp nut and bolt 205C is placed in the bolt hole and tightened it closed the small gap and acts to increase frictional forcers between the frame crimp clamps and the frame stringers 201 and 203. The module crimp clamps 207 have an opening 207B. The module crimp clamp body 207A has an upper and lower part. The two parts of the module crimp clamp body 207A are connected by module crimp clamp nuts and bolts 207C. When the module crimp clamp nuts and bolts 207C is placed in the bolt hole and tightened it closes the gap between the two parts of the module crimp clamp body 207A and acts to increase frictional forcers between the module crimp clamps 207 the cross stringers 203. The module crimp clamp body 207A has a module stud 207D that protrudes from the module crimp clamp 207 and is what the flexible modules 600, 500 or 400 are bolted onto.

At least three inflatable pontoon-skegs 101 are underneath the flexible frame 200 and are all parallel to one another. At least two longitudinal stringers 201 are connected to each of the pontoon-skegs 101. In a preferred embodiment the longitudinal stringers 201 pass through pontoon-skeg loops 103 along the length of the pontoon-skeg 101. The pontoon-skeg loops 103 have gaps such that a frame crimp clamp 205 are attached to the longitudinal stringers 201 and are attachable to the cross stringers 203.

In a preferred embodiment the longitudinal stringers 201 and cross stringers 203 are tubular. In a further embodiment the flexible frame stringers 201 and 203 are made of an aluminum alloy chosen for its flexibility and lightness while still providing strong though flexible frame. A further advantage of aluminum is it maintains flexibility and suffers little or no mechanical deformation in many conditions and in many different operating temperatures.

Figure 23:
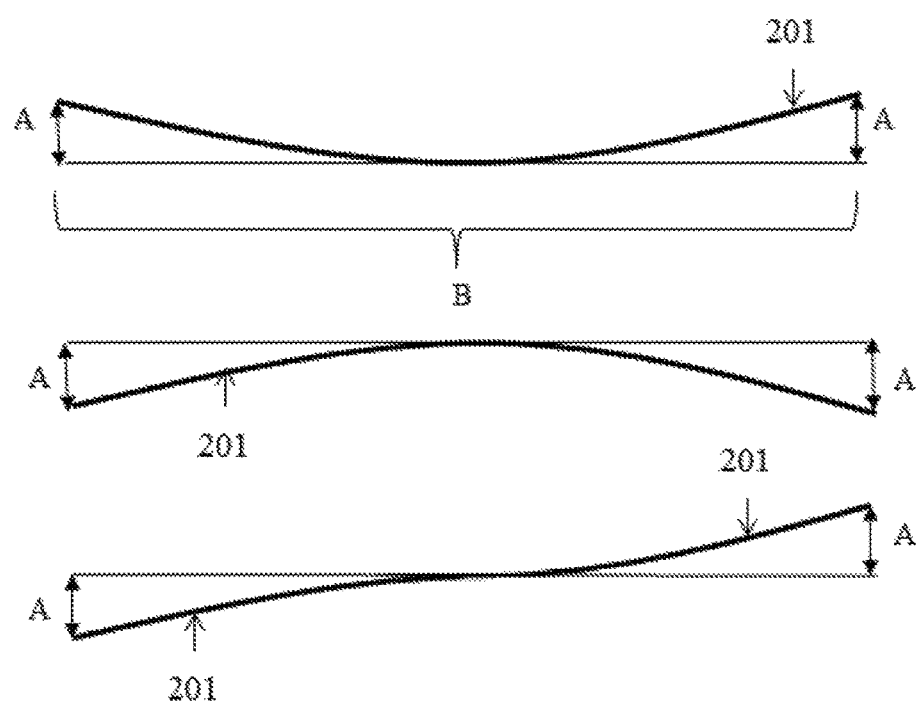
FIG. 23 demonstrates the flexibility of the ATV's frame pieces.

FIG. 23 shows the flexibility of the longitudinal stringers 201 and flexible frame 200. The longitudinal stringers 201 and flexible frame 200 can curve up to 20 degrees which corresponds to length A. In a preferred embodiment the longitudinal stringers 201 have a length B of 6 meters. In this preferred embodiment the 20 degrees of flexibility in either direction, up or down, mean length A is equal to 1 meter.

Flexible powertrain module 600 includes powertrain frame 221 which connects to flexible frame 200 by module crimp clamps 207. A propulsion fan support 223 is connected to powertrain frame 221 and braced by propulsion fan support braces 225. The powertrain frame 221 is also connected to engine and lift fan support frame 227.

The engine and lift fan support frame 227 houses power transfer gear between the lift fan power shafts 607 which connect the engine to the lift fans 701. The engine is covered by engine cover 621.

When the engine used is an internal combustion engine 601 there is a propulsion fan transfer case 603 which may be a transmission, torque converter, reduction gear, or flywheel. The propulsion fan transfer case 603 is connected to propulsion fan drive shaft 605 which passes through propulsion fan support 223. Propulsion fan drive shaft 605 is connected to propulsion fan pulley 707 by propulsion fan pulley belt 705. Propulsion fan 703 is mounted to propulsion fan pulley 707 which is also mounted to the propulsion fan support 223. Propulsion fan 703 is surrounded by propulsion fan housing 711 which is mounted to propulsion fan support 223. Steering rudders 721 are mounted to the propulsion fan housing 711.

Internal combustion engine 601 has air intake 611, radiator 615, and exhaust 613. The radiator 615 is mounted to the propulsion fan support 223 in a preferred embodiment for better cooling efficiency and means the propulsion fan 703 acts as a radiator fan.

In a preferred embodiment a rotating beacon light 801 is mounted on top of the propulsion fan support 223 for increased visibility of the ATV 000.

Flexible passenger cabin 400 and flexible cargo platform 500 have flexible module frame 211. Flexible module frame 211 and flexible module platform 209 connect to flexible frame 200 by module crimp clamps 207. At the front of the flexible passenger cabin 400 or flexible cargo platform 500 is windshield 251 which is mounted to flexible module frame 211. A canopy 231 may also be mounted to flexible module frame 211 providing cover to pilot and passengers or cargo. Behind the windshield 251 are a pilot dashboard 301 with controls for the ATV 000 and a pilot's seat 303. The pilot dashboard 301 and pilot's seat 303 are mounted to flexible module platform 209. The pilot dashboard 301 is connected to the flexible powertrain module 600 electronically so that a pilot controls the lift fans 701, propulsion fan 703, and steering rudders 721.

Behind pilot's seat 303 is either empty space for cargo or passenger seats 401.

In a preferred embodiment headlights 803 are mounted to flexible module frame 211 at the front of the ATV 000.

The specific embodiments described herein are intended to further explain the best mode known for practicing the disclosure and to enable others skilled in the art to utilize the disclosure in such, or other, embodiments and with various modifications required by the particular applications or uses of the present disclosure. The specific techniques, conditions, materials, and proportions set forth to illustrate the principles and practice of the invention are exemplary only and should not be taken as limiting the scope of the invention. It is intended that the appended claims be construed to include alternative embodiments to the extent permitted by the prior art.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. An amphibious transformer vehicle (ATV), comprising:
   at least two inflatable pontoon-skews being parallel and adjacent with a space between the at least two inflatable pontoon-skegs running a longitude of the ATV;
   two of the at least two inflatable pontoon-skegs form a pontoon-skeg pair;
   wherein each inflatable pontoon-skeg is only a component in up to two pontoon-skeg pairs;
   in the space between the at least two inflatable pontoon-skegs there is a front skirt and a rear loop bag;
   an air chamber cell is formed by the pontoon-skegs as a pair of sidewalls, the front skirt, and the rear loop bag;

the air chamber cell maintains an air pressure and a volume controlled by a lifting fan;

connected to and on top of the at least one pontoon-skeg pair there is a flexible frame changing its shape when the ATV travels over a surface with bumps, the flexible frame comprising a plurality of longitudinal stringers and a plurality of cross stringers, the longitudinal stringers flexing up to 20 degrees upward and up to 20 degrees downward from each middle point of the longitudinal stringers when installed on the ATV;

connected to the flexible frame there are modules including a powertrain module, a pilot dashboard, and a cargo module or cabin module;

the modules are connected to the flexible frame by a plurality of module clamps;

the lifting fan is part of the powertrain module; and the ATV being capable of traveling over varied terrain including water, snow, ice, ground, sand and other loose surfaces, paved and other hard services, grass, and light vegetation.

2. The ATV of claim 1, wherein the longitudinal and cross stringers are connected by crimp clamps.

3. The ATV of claim 1, wherein each one of the plurality of longitudinal stringers is 6 meters.

4. The ATV of claim 1, wherein the plurality of longitudinal stringers and the plurality of cross stringers are tubular.

5. The ATV of claim 4, wherein the plurality of longitudinal stringers and the plurality of cross stringers are made of an aluminum alloy.

6. The ATV of claim 1, wherein the longitudinal stringers and cross stringers are connected without holes in any stringers and without welding: the longitudinal stringers and cross stringers being connected by a plurality of crimp clamps.

7. The ATV of claim 6, wherein each of the plurality of crimp clamps are machined from solid aluminum bars, have two ends, have an opening on each end, and have a crimp bolt hole at each end, a crimp bolt passes through each crimp bolt hole, when the crimp bolt is tightened with a nut it increases the frictional grip of the crimp clamp on the longitudinal stringer or on the cross stringer to which the crimp clamp is connected.

8. The ATV of claim 7, wherein the two openings of the crimp clamp are positioned at 90-degree angles from each other so that the longitudinal stringer and the cross stringer are held perpendicular to one another.

9. The ATV of claim 1, wherein each of the at least two inflatable pontoon-skegs are protected by replaceable polyethylene shells that are attached to each of the at least two inflatable pontoon-skegs by lacing.

10. The ATV of claim 1, wherein the pilot dashboard has a valve controller which controls at least one valve in each of the at least two inflatable pontoon-skegs, the at least one valve controlling an inflatable pontoon-skeg air pressure.

11. The ATV of claim 10, wherein the inflatable pontoon-skeg air pressure is adjusted to between 1.5 and 3.0 pounds per square inch (psig) to go over flat terrain for higher speeds and better fuel economy.

12. The ATV of claim 10, wherein the inflatable pontoon-skeg air pressure is adjusted to between 0.5 and 1.5 pounds per square inch (psig) to go over more difficult terrain and pass obstacles.

13. The ATV of claim 1, wherein the cargo module or the cabin module has a canopy.

14. The ATV of claim 1, wherein the ATV comprises at least three inflatable pontoon-skegs forming at least two air chamber cells.

15. The ATV of claim 1, wherein the powertrain module has at least one lifting fan per air chamber cell and at least one propulsion fan controlled at the pilot dashboard.

16. The ATV of claim 15, wherein the at least one propulsion fan has at least one rudder controlled at the pilot dashboard for directional control of the ATV.

17. The ATV of claim 1, wherein the powertrain module has an internal combustion engine mechanically linked to the lifting fan for each air chamber cell and mechanically linked to at least one propulsion fan.

18. The ATV of claim 1, wherein the module clamps have predrilled bolt holes to connect the powertrain module, the cabin module or the cargo module, and the pilot dashboard at predetermined attachment points to the flexible frame.

19. The ATV of claim 1, wherein module clamps are module crimp clamps for attaching the powertrain module, the cabin module, or the cargo module.

20. The ATV of claim 19, wherein each module crimp clamp comprises a protruding module stud, wherein the powertrain module, the cabin module, or the cargo module is bolted onto said protruding module stud.

* * * * *